United States Patent
Johnston et al.

[15] 3,689,671
[45] Sept. 5, 1972

[54] P-AMINO-P'-UREIDODIPHENYL SULFONE IN TREATING MAREK'S DISEASE

[72] Inventors: David B. R. Johnston, Warren; Theodore A. Maag, New Shrewsbury; Tsung-Ying Shen, Westfield, all of N.J.

[73] Assignee: Merck & Co., Inc., Rahway, N.J.

[22] Filed: Aug. 12, 1970

[21] Appl. No.: 63,264

Related U.S. Application Data

[63] Continuation-in-part of Ser. No. 878,589, Nov. 20, 1969, abandoned.

[52] U.S. Cl. ..................................................424/322
[51] Int. Cl. ...............................................A61k 27/00
[58] Field of Search......................................424/322

[56] References Cited

UNITED STATES PATENTS 2,328,548   9/1943   Dohrn et al.............260/397.6

OTHER PUBLICATIONS

Pohls, Chem. Abst. Vol. 49, (1955), page 10367 & 10368.

*Primary Examiner*—Sam Rosen
*Attorney*—I. Louis Wolk, J. Jerome Behan and Hesna J. Pfeiffer

[57] ABSTRACT

The use of p-amino-p'-ureidodiphenyl sulfone and soluble salts thereof in reducing mortality and decreasing lesion incidence of poultry exposed to Marek's disease and to compositions comprising the p-amino-p'-ureidodiphenyl sulfone as the active ingredient are provided.

7 Claims, No Drawings

P-AMINO-P'-UREIDODIPHENYL SULFONE IN TREATING MAREK'S DISEASE

CROSS REFERENCE TO OTHER APPLICATIONS

This application is a continuation-in-part of our copending application, U.S. Ser. No. 878,589, filed Nov. 20, 1969 now abandoned.

DESCRIPTION OF THE PRIOR ART p-Amino-p'-ureidodiphenyl sulfone is disclosed in U.S. Pat. No. 2,328,548 (1943). The compound was disclosed to have activity against cocci-caused infections.

SUMMARY OF THE INVENTION

The use of p-amino-p'-ureidodiphenyl sulfone is provided for the treatment and prophylaxis of Marek's disease, to prevent poultry death and sickness as well as to decrease the incidence of lymphoproliferative foci and associated inflammatory-like lesions. It also serves as a growth promotant by decreasing subclinical disease. Poultry feed compositions are provided which contain the p-amino-p'-ureidodiphenyl sulfone in low concentrations, but which are active against the disease. In addition, soluble salts of p-amino-p'-ureidodiphenyl sulfone are provided which can be dissolved in the drinking water for ease of treatment of the poultry. A feed supplement premix is also provided containing the active compound p-amino-p'-ureidodiphenyl sulfone.

Marek's disease is a highly infectious lymphoproliferative disorder of poultry, especially chickens. Marek's disease has also been known as neural leukosis. The causative agent (s) are viral with a DNA-type virus implicated as an etiological factor. Marek's disease often is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are one or more of the following: lymphocytic infiltrated peripheral nerves and/or feather follicles, lymphoproliferative lesions, microscopic to several mm. in size, within any tissue of the body but principally within the liver, spleen, kidney, gonads, heart, proventriculus, breast muscle, skin, and nerves.

Marek's disease is estimated by the U. S. Department of Agriculture to cause a $200 million annual loss to the U.S. poultry industry. This loss is due to mortality and morbidity and to the rejection of slaughtered bird carcasses as being unfit for human consumption. This rejection is due to the presence of the lymphoproliferative foci.

The compound of this invention, p-amino-p'-ureidodiphenyl sulfone also serves as a growth promotant for poultry when administered at the disclosed dosage levels. By definition a "growth promotant" is meant to be an agent which promotes weight gain and increases feed efficiency. Feed efficiency is usually expressed as the pounds of feed required to produce one pound gain in live body weight. The growth promoting ability of p-amino-p'-ureidodiphenyl sulfone has been determined utilizing healthy, uninfected chicks housed in floor pens within a poultry house environment typical to that of the poultry industry. The birds are not artificially infected; however, no attempt is made to provide an extraordinary environment of any type for the birds. In other words, the chicks are subjected to normal and natural field conditions. One group of birds is provided with the stated dosage levels of p-amino-p'-ureidodiphenyl sulfone and a control group of birds is given normal rations containing no chemical compound. Results over the test duration indicate a statistically significant weight gain in the birds fed the diet containing the p-amino-p'-ureidodiphenyl sulfone over the control animals. A statistically significant improvement in feed efficiency is also noted.

Although we do not wish to be bound by theory, the growth promotant ability of this drug may be due, in part, to the decrease in subclinical disease. By definition "subclinical disease" is meant to be a disease which is not detectable or measurable by any gross or microscopic inspection of the bird. No symptoms of any known disease are present in the chicken. However, since Marek's disease virus(es) exist in equilibrium in the environment, the mechanism of action of the p-amino-p'-ureidodiphenyl sulfone could be related to interaction with the virus in the poultry host in a yet undetermined process.

The compound which, according to this invention, has been found to be highly active against Marek's disease is p-amino-p'-ureidodiphenyl sulfone. This compound is also known as 4-(sulfanilyl)-phenyl urea. The structure of the compound is

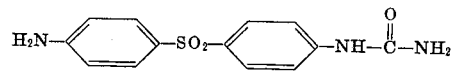

In a typical experiment, out of 30 unmedicated infected birds (the control group), 26 died within the time period. Twenty-eight birds had lymphoproliferative lesions visible upon gross inspection. These lesions were of a character that would have warranted condemnation of the chicken, and exclusion from the market by prevailing inspection standards. The 20 medicated infected and five non-medicated, non-infected control birds had zero mortality and no visible lesions.

In accordance with this invention, the p-amino-p'-ureidodiphenyl sulfone is employed for controlling Marek's disease by oral administration to poultry susceptible to the disease, either in the drinking water or feed.

It is preferred to disperse the diphenyl sulfone in the finished feed of the animals, and to administer the medicated feed ad libitum to the birds. Good results against Marek's disease are achieved with feedstuff containing from about 0.0002 to 0.1 percent by weight of the p-amino-p'-ureidodiphenyl sulfone. Drug levels can also operably be from 0.00005 to 0.2 percent in the feed. The preferred range is between 0.001 to 0.01 percent in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that the lowest levels consonant with adequate control of Marek's disease will be used in most instances in order to eliminate as far as possible any side effects that might be induced on prolonged feeding of unnecessarily high levels. The finished feed in which the above-described levels of p-amino-p'-ureidodiphenyl sulfone are employed is a nutritionally adequate one containing sources of carbohydrate, protein, fat, vitamins, minerals and other nutritional factors commonly employed in commercial poultry raising. In addition, other poultry feed additives such as coccidiostats, e.g., Amprolium, ethopabate, nicarbazin, can be employed in the compositions. The feeds can also contain additives which potentiate or attenuate the action of the p-amino-p'-ureidodiphenyl sulfone so that lower or higher levels can be used in the feed.

In addition to administration via the solid feedstuff, the compound of the invention may be administered to poultry by incorporation in the drinking water. The preferred dose levels in the drinking water are usually somewhat less than those employed in a solid feed inasmuch as poultry drink about twice as much as they eat. The operable level in drinking water is from 0.00001 to 0.1 percent by weight of p-amino-p'-ureidodiphenyl sulfone, the preferred range is 0.0002 to 0.1 percent by weight. Administration via the drinking water is of advantage when using the compound therapeutically rather than prophylactically. For this purpose it is convenient to prepare dispersible or water-soluble powders in which the p-amino-p'-ureidodiphenyl sulfone is intimately dispersed in a suitable water-soluble or dispersible liquid or solid carrier such as dextrose, sucrose, DMSO, or other suitable non-toxic carriers, at concentrations of from about 0.03 percent to about 25 percent by weight. These solids may then be conveniently added to the drinking water by the poultry grower.

A typical drinking water formulation contains p-amino-p'-ureidodiphenyl sulfone, 0.3 percent; 1-(2-n-propyl-4-amino-5-pyrimidinylmethyl)-2-methyl pyridinium chloride hydrochloride, 9.6 percent; dextrose, 30 percent; propylene glycol, 20 percent; dimethylpolysiloxane, 0.002 percent; polyoxyethylene sorbitan monoleate, 0.2 percent; water, to 100 percent.

According to a further aspect of this invention there are provided compositions comprising poultry feed supplements or additives containing the p-amino-p'-ureidodiphenyl sulfone previously described as an effective Marek's disease agent. In such compositions the compound is mixed with or dispersed in an orally ingestible carrier vehicle that is nontoxic to the poultry and compatible with the finished feedstuff. These feed supplements contain a significantly higher percentage of p-amino-p'-ureidodiphenyl sulfone than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The diphenyl sulfone described hereinabove may be formulated into feed supplement compositions containing from about 0.05 percent to about 50 percent by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0 percent to about 20 percent by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compound of the present invention are (A)

|  | Lbs. |
|---|---|
| p-amino-p'-ureidodiphenyl sulfone | 1.5 |
| Amprolium | 25.0 |
| Wheat middlings | 73.5 |

(B)

| p-amino-p'-ureidodiphenyl sulfone | 5.0 |
|---|---|
| Corn gluten feed | 95.0 |

(C)

| p-amino-p'-ureidodiphenyl sulfone | 2.0 |
|---|---|
| Corn germ meal | 40.0 |
| Corn distillers' grains | 58.0 |

(D)

|  | Lbs. |
|---|---|
| p-amino-p'-ureidodiphenyl sulfone | 1.0 |
| Corn distillers' dried grains | 99.0 |

(E)

| 2,4-diamino-5-(p-chlorophenyl)-6-ethyl pyrimidine | 0.5 |
|---|---|
| p-amino-p'-ureidodiphenyl sulfone | 2.0 |
| Distillers' dried grains | 97.5 |

The compound p-amino-p'ureidodiphenyl sulfone used in this invention can be prepared using the following procedures. The starting material is p-nitro-p'-acetyl amino diphenyl sulfone. The starting material is hydrolyzed to p-amino-p'-nitrodiphenyl sulfone. Acid hydrolysis is preferred, and a strong mineral acid such as hydrochloric or sulfuric acid can be used. The hydrolysis is conducted at an elevated temperature, from 60° C. to the reflux temperature of the solvent. The preferred solvent is water, although any solvent for both the starting material and the acid can be used.

The p-amino-p'-nitrodiphenyl sulfone is then treated with phosgene ($COCl_2$). An excess of the chosen reagent is employed, and the two compounds are reacted in a warm (30°–50° C.) solution of a solvent such as dioxane or dimethylsulfoxide. After removal of the solvent, the product is redissolved in a solvent such as benzene, xylene, or a suitable hydrocarbon solvent, and heated at reflux for 6–20 hours. The product obtained is p-nitro-p'-isocyanatodiphenyl sulfone.

The latter compound is then reacted with an ammoniating reagent such as ammonia. The reaction preferably takes place in a solvent such as dioxane or dimethylsulfoxide. An excess of the chosen ammoniating agent is added to the solution. The temperature is 30°–60π o c. The product obtained is p-nitro-p'-ureidodiphenyl sulfone.

This latter compound is then reduced using hydrogen and a Raney nickel or other suitable catalyst to yield the desired p-amino-p'-ureidodiphenyl sulfone.

The following example describes one method of preparing the p-amino-p'-ureidodiphenyl sulfone compound.

EXAMPLE

A 126 g. portion of p-nitro-p'-acetylaminodiphenyl sulfone is suspended in 600 ml. of 18.5 % HCl. The mixture is stirred and refluxed for 2 hours. After cooling, the solid is collected on a filter and suspended in one liter of water before neutralization with 50% NaOH. The product, after washing and drying, yields 97 g., m.p. 166°–169° C., and is identified as p-nitro-p'-aminodiphenyl sulfone.

A 91.4 g. portion of the p-nitro-p'-aminodiphenyl sulfone is dissolved in 400 ml. of warm dioxane. This solution is added slowly to 350 ml. of dioxane into which phosgene gas is bubbling. Addition of phosgene is continued for 30 minutes following completion of addition of the diphenyl sulfone. After stirring an hour more, the dioxane is removed in vacuo and the residue suspended in 600 ml. of benzene. The mixture is refluxed overnight. The product of this reaction is p-nitro-p'-isocyanatodiphenyl sulfone. However, this product is not isolated in the purified form, but obtained as a concentrate from the filtrate of the benzene solution. The concentrate thus obtained is suspended in 600 ml. of dioxane and warmed until dissolved. This solution is added to 500 ml. of dioxane into which ammonia gas is bubbled. The ammonia is bubbled in for 10 minutes prior to and 1 hour after the addition of the isocyanato sulfone solution.

A solid product is precipitated and collected. After washing and recrystallization, 86 g. of p-nitro-p'-ureidodiphenyl sulfone, m.p. 245°–247.5° C., is obtained.

32.1 G. of the above product is hydrogenated in 500 ml. of ethanol at 3 atm. in the presence of 1 tsp. of Raney nickel catalyst. Insolubles are removed by filtration and extracted with hot methanol. The mother liquors are concentrated. 25.6 G. total of the product, p-amino-p'-ureidodiphenyl sulfone is recovered, having a m.p. of 211°–213° C.

We claim:

1. The method for combatting Marek's disease in poultry which comprises orally administering to poultry a feedstuff containing from about 0.00005 to 0.2 percent by weight of p-amino-p'-ureidodiphenyl sulfone or a salt thereof.

2. The method for combatting Marek's disease in poultry which comprises orally administering to poultry a feedstuff containing from about 0.0002 to 0.1 percent by weight of p-amino-p'-ureidodiphenyl sulfone or a salt thereof.

3. The method for combatting Markek's disease in poultry which comprises orally administering to poultry a feedstuff containing from about 0.001 to 0.01 percent by weight of p-amino-p'-ureidodiphenyl sulfone or a salt thereof.

4. A composition which comprises a poultry feedstuff having admixed therein from about 0.00005 to 0.2 percent by weight of p-amino-p'-ureidodiphenyl sulfone or a salt thereof.

5. A composition which comprises a poultry feedstuff having admixed therein from about 0.0002 to 0.1 percent by weight of p-amino-p'-ureidodiphenyl sulfone or a salt thereof.

6. A composition which comprises a poultry feedstuff having admixed therein from about 0.001 to 0.01 percent by weight of p-amino-p'-ureidodiphenyl sulfone or a salt thereof.

7. A poultry feed pre-mix composition which comprises a solid nutritive orally ingestible poultry feed additive having admixed therein from about 1 percent to about 5 percent by weight of p-amino-'-ureidodiphenyl sulfone or a salt thereof.

* * * * *